June 27, 1967 J. BLOMET ETAL 3,327,346
MACHINE FOR THE EXTRUSION OF PASTE PRODUCTS
Filed Feb. 23, 1965 2 Sheets-Sheet 1
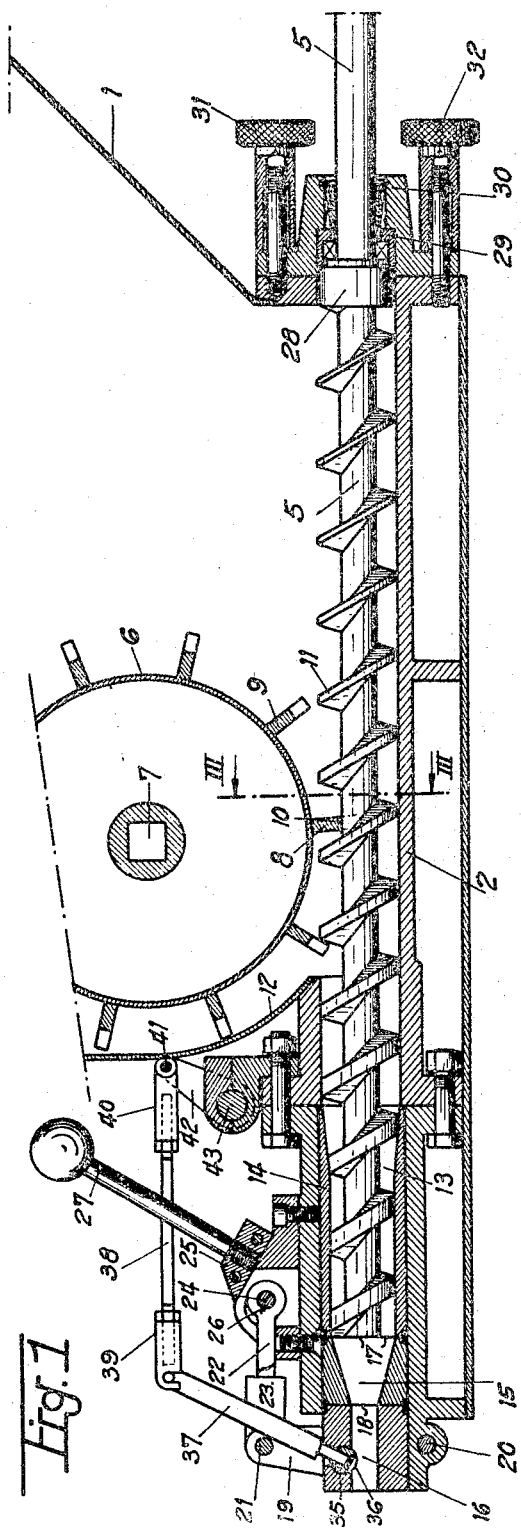
Fig. 1
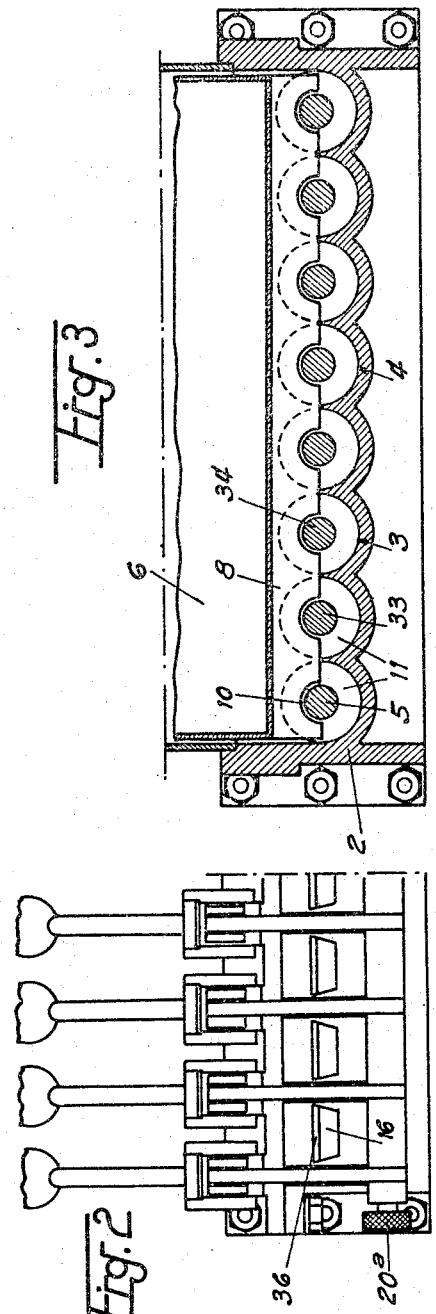
Fig. 2
Fig. 3

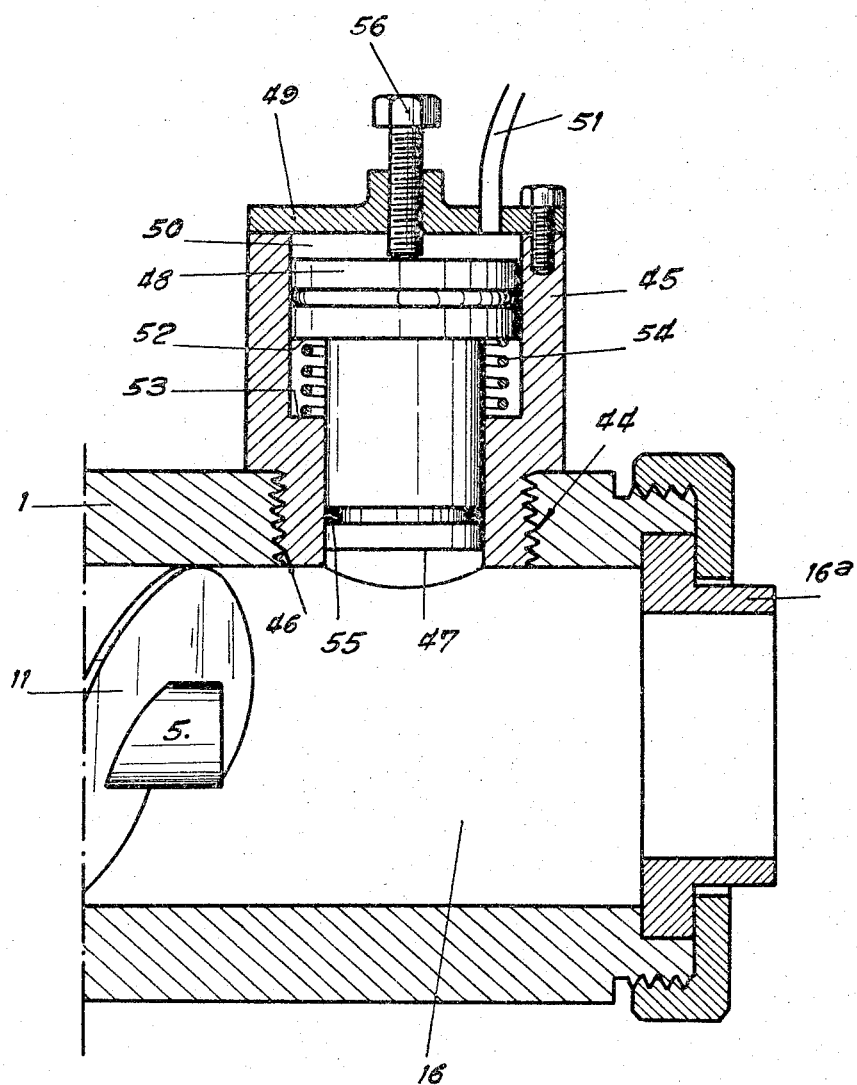

United States Patent Office 3,327,346
Patented June 27, 1967

3,327,346
MACHINE FOR THE EXTRUSION OF
PASTE PRODUCTS
Jacques Blomet, 148 bis Rue de Longchamp, Paris, France, and Gilbert Coindreau, La Germoniere, Montamise, France
Filed Feb. 23, 1965, Ser. No. 434,223
Claims priority, application France, Feb. 24, 1964, 964,850, Patent 1,394,866; Oct. 28, 1964, 992,954, Patent 1,421,436
11 Claims. (Cl. 18—12)

A large number of industries are devoted to the preparation of products which are presented on completion of the manufacturing process in the form of pastes having a more or less thick consistency which are converted into rods by extrusion. These rods can then be introduced inside wrapping materials such as supple tubes or casings or else they can be divided into elements of predetermined length which are then wrapped separately.

Extrusion devices have already been constructed for the purpose of extruding pastes having more or less high viscosity wherein each extruding machine is adapted to produce a rod of predetermined size. Machines of this type consist in the combination of an extruding screw which is disposed at the bottom of a feed hopper and a combining tube which terminates in an extrusion nozzle and which is supplied by said screw; the extrusion nozzle imparts the requisite shape to the rod of paste.

The machines of this type give rise to a number of disadvantages, a certain number of which are inherent in the design of the machine whilst others lie in the nature of the product to be conditioned and which may have a very high degree of viscosity.

Among the disadvantages of the first kind mentioned above, it is found in particular that each machine is capable of producing only a single rod. This accordingly entails the need to provide a number of machines of this type when the volume of production is fairly large, each machine being provided with its individual feed hopper, power source and so forth. The extruding process is therefore costly.

In the second place, the known devices have a disadvantage in that, if the viscosity of the paste product is too high, the extruding screw bores a passage through the mass of surrounding product, but the product does not move down towards the screw under the action of its own weight, with a resulting stoppage in the supply to the extrusion nozzle.

This invention is primarily directed to a machine of the type hereinabove specified which is designed to deliver a continuous rod of paste product irrespective of the viscosity of said product and without any intervention of the operator.

The present invention is also directed to a machine which is designed to deliver simultaneously a plurality of extruded rods in any desired number and which is designed to produce a rod which is both continuous as well as endowed with uniform physical and dimensional characteristics.

A machine in accordance with the present invention essentially comprises in combination a feed hopper which contains the product to be extruded, at least one extruding screw disposed at the bottom of said hopper, an extrusion nozzle which is coaxial with said extruding screw and fed by said screw and a vane-wheel which is mounted to rotate freely at the bottom of the feed hopper and the vanes of which are adapted to cooperate with the tread flank of the extruding screw by which said vane-wheel is driven in rotation.

In one particularly advantageous form of embodiment of this invention, a same feed hopper is combined with at least two parallel extruding screws and each screw is designed to feed one extrusion nozzle which is associated therewith, the vane-wheel being accordingly constructed in the form of a drum which is common to all of said extruding screws.

In accordance with an advantageous mode of execution of the invention, the flank of each extruding screw has a pitch which varies from one end to the other; said screw conveys the paste product into an expansion chamber then into a compression chamber and finally through an extrusion nozzle which endows the rod of product with its final external shape.

In accordance with a characteristic feature of this mode of execution, the elements which constitute the expansion chamber, the compression chamber and the extrusion nozzle are assembled together simply by juxtaposition and maintained in position by a pressure which is exerted parallel to the axis of the extruding screw.

In accordance with another characteristic feature of the invention, there is mounted within the extrusion nozzle a member which is capable of moving under the action of control means, said movable member being designed to permit the possibility of varying at will the depth of passage of the extrusion nozzle with a view to regulating the thickness of the rod of paste material. When the machine comprises a number of extruding screws and consequently a number of extrusion nozzles, said movable member can be common to all of the nozzles; it would also be within the scope of this invention to provide each nozzle with a member of this type with which is associated a separate control means.

When the machine in accordance with the invention comprises a plurality of parallel extruding screws, these screws are driven in rotation from a single motor equipped with a speed-changing mechanism, the transmission of motion being carried out in such manner, that two consecutive screws rotate in opposite direction with respect to each other. It is possible, for example, to control the rotation of one screw directly from the speed-changing mechanism whilst the following screw is driven in rotation by means of a pinion keyed on the shaft of the previous screw and engaged with a pinion which is keyed on its own shaft.

However, the paste product frequently contains very small air bubbles which are compressed while material is being fed in by the screw. When the feed screw stops, these air bubbles expand and the rod of paste product continues to move forward for a very short moment. Consequently, the extruded section which should weigh, for example, two hundred and fifty grams is liable to weigh up to two hundred and fifty-five grams, thus resulting in a dead loss for the user of the machine.

In an advantageous form of embodiment of the machine, provision is made for a simple device which serves to reduce to zero any pressure within the product which is present within the extrusion chamber as soon as the screw which feeds this chamber comes to a stop.

A device for the practical application of the method in accordance with the invention comprises in combination a displaceable piston of which the underface constitutes a portion of the wall of the extrusion chamber, an annular shoulder against which said piston can be abuttingly applied with a view to limiting the travel of said piston towards said chamber, means for applying said piston against said annular shoulder, and a control member for releasing said piston at the moment when the feed screw comes to a stop.

In a particular form of embodiment of said device, the piston face opposite to the face which partially forms the wall of the extrusion chamber is subjected to the action of a compressed-air pressure which is reduced to zero at the moment when the feed screw is caused to stop.

Further characteristic features of the invention will be brought out by the description which follows below, reference being made to the accompanying drawings which are given solely by way of example without any limitation being implied, and in which:

FIG. 1 is a view in elevation of one form of embodiment of the invention, this view being taken in cross-section along a plane parallel to the axis of the extruding screws;

FIG. 2 is a partial front view of a machine comprising a number of screws;

FIG. 3 is a cross-section taken along the line III—III of FIG. 1.

FIG. 4 is a longitudinal cross-section of an alternative form.

As shown more especially in FIG. 1, the apparatus consists of a feed hopper 1 which is made integral with a member 2 which forms a base, the paste product to be extruded being intended to be fed into said hopper.

Grooves such as 3, 4, etc. . . . which are of semi-cylindrical shape are formed in the internal face of the base member 2 and the number of said grooves corresponds to the number of extruding screws such as the screw 5 with which the machine is provided. Any desired number of grooves and consequently of extruding screws can be provided in the base of the feed hopper, eight grooves and screws having been shown by way of example in the form of execution which is illustrated in the drawings.

There is also mounted in the vicinity of the bottom of said hopper and close to the front face thereof a drum 6 which is keyed on a shaft 7 and the length of which is substantially equal to the width of the hopper as shown in particular in FIG. 3, the shaft 7 is mounted to rotate freely within its journal-bearings. Vanes 8, 9, etc. . . . are fixed to the outer surface of the drum 6 and project radially from this latter. Semi-circular recesses such as the recess 10 are formed in the outermost extremities of the vanes in such manner that each vane can cooperate with the thread flank such as 11 of each extruding screw without interfering with the shaft such as 5 of said screw. The result achieved by this arrangement is that the rotation of the screw 5 applies the thread flank 11 against the vanes 8, 9, etc. . . . and consequently drives the drum 6 in rotation.

The distance between two consecutive vanes such as the vanes 8, 9 is substantially equal to and preferably greater than the pitch of the screw thread flank 11; in addition, the front partition wall 12 of the hopper is arcuate as shown in FIG. 1 so as to cooperate with the vanes.

The screw then rotates within a chamber 13 of smaller diameter, the external diameter of said chamber being substantially equal to the external diameter of the screw thread flank and the removable liner tube 14 of said chamber can be coated internally with a layer of plastic material, for example a layer of nylon or polyethylene. The said liner tube 14 is preferably inserted with friction inside its housing. The said chamber 13 is followed by a compression chamber 15 and finally by the extrusion nozzle 16. The chamber 15 and the nozzle 16 are also constituted by elements which are frictionally mounted in the frame of the machine and an outer O-ring seal is fitted between said chamber and said nozzle.

The extrusion nozzle 16 has in this case a trapezoidal cross-section as shown in particular in FIG. 2. The chamber 15 accordingly has a transverse cross-sectional configuration which changes progressively from the inlet 17 at which said chamber has a circular shape to the outlet 18 at which said chamber has a trapezoidal shape corresponding to the trapezoidal cross-section of the nozzle 16.

The liner tube 14 and the parts in which the chamber 15 and nozzle 16 are pierced are held assembled together in the following manner:

There corresponds to the extrusion nozzles at least one link-arm 19, said link-arm or arms being pivoted to a cross-pin 20 which can be operated by means of a knurled knob 20a (as shown in FIG. 2). Said link-arm 19 is applied against a member which forms part of the extrusion nozzle. At the opposite end of the link-arm 19 is pivoted at 21 a link-arm 22, the length of which can be adjusted by means of the threaded sleeve 23. Said link-arm 22 is swingable on the pin 24 which is in turn carried by a member 25 and this latter is adapted to pivot about the point 26 which is eccentric with respect to the pin 24. Finally, the member 25 can be displaced angularly by means of the lever 27.

The result achieved by the eccentric relation of the axes 24 and 26 is that, if the lever 27 is swung forward, the link-arm 22 moves towards the left-hand side and is accompanied in its motion by the link-arm 19. After removal of the cross-pin 20, it is therefore possible to disassemble first the nozzles such as the nozzle 16 and then the two members which follow said nozzle. The cleaning of the machine is thus greatly facilitated.

At the end of the machine opposite to that which has just been described, the shafts of the different extruding screws such as the screw 5 are provided with a collar 28 which is rotatably mounted within a suitable opening formed in the frame of the machine. Said shafts are held in position by a bushing 29 which is brought to bear on the collar 28 and against which is in turn applied a bushing 30. The bushing 30 is joined to the frame of the machine by means of two bolts 31, 32 with knurled heads.

As will be apparent, when the machine comprises a plurality of parallel-spaced extruding screws, the bushing 30 can either be common to all of the extruding screws in the form of a metal bar pierced with openings which provide passageways for the shafts such as the shaft 5 or, alternatively, said bushing can consist of a separate component in respect of each shaft.

It follows from the foregoing that the machine components can immediately be separated from each other without calling for any tools, which results especially in easy maintenance.

The operation of this machine is as follows:

If consideration is given to a vane which is located on the right hand side of the drawing, said vane moves at the same time as the drum within the paste to be extruded and conveys this paste towards the screw, thus producing a compression of said paste between the vane and the screw thread flank. It is also apparent that these vanes oppose any tendency of the paste product to move in rotation as its comes into contact with the screw. There is therefore a zone of compression of the paste on the downstream side of the drum 6 followed by a certain decompression in the vicinity of the front face 12 of the feed hopper when the corresponding vane moves away from the screw.

As a consequence, the screw 5 conveys the maximum quantity of paste as a continuous process and is therefore similar in working principle to a volumetric pump. The reduction in volume which is afforded to the paste within the chambers 13 and 15 has the additional effect of regularizing the weight of the paste conveyed and thus of giving a uniform weight of product per unit length of rod produced, the precision achieved being such as to permit a tolerance of less than 1%.

In order to facilitate the conveying and constant distribution of the paste in a machine in accordance with the invention which is provided with a plurality of parallel-spaced screws, the successive screws such as the screws 5 and 33 rotate in opposite directions relative to each other and have thread flank of opposite pitch.

The above arrangement can be carried into practical effect by driving the shaft 5 by means of a motor and by coupling the shaft 5 to the shaft 33 by means of a pair of identical pinions. Similarly, the shaft 33 will be coupled to the following shaft 34 and so forth, especially with a view to ensuring that the screw which is carried by the shaft 34 will have the same pitch and will rotate in the same direction as the screw which is carried by the shaft 5.

It can prove an advantage to regulate the cross-sectional area of the rod of product which is delivered from the extrusion nozzle 16. Provison is accordingly made for a small barrel 35 which may or may not be common to all the nozzles 16 and which is adapted to rotate about an axis parallel to the cross-pin 20 and at right angles to the plane of FIG. 1.

Said barrel 35 projects to a partial extent into the interior of the nozzle 16 and is provided with a flattened portion 36 formed between two generatrices. In a certain angular position of the drum 35, said flattened portion 36 is located in the same plane as the top wall of the extrusion nozzle 16 which then has its maximum cross-sectional area.

The barrel or barrels referred-to can be caused to rotate so as to bring the flattened portion 36 into an oblique position such as that which is shown in FIGS. 1 and 2, so that the depth of the extrusion nozzle 16 decreases progressively as the angle of rotation of the drum increases. This movement of rotation is controlled by a connecting-rod 37 which is fast with the barrel and which is coupled to another connecting-rod 38, the length of which is adjustable by virtue of threaded end sleeves 39 and 40, said connecting-rod 38 being coupled in turn through the intermediary of the shaft 41 to a crank-arm 42 which is keyed on the shaft 43.

It follows as a result of the arrangement described above that, if the crank-arm 42 is displaced towards the right-hand side as a result of a movement of rotation imparted to the shaft 43, the barrel 35 rotates in the clockwise direction and the outlet cross-sectional area of the extrusion nozzle is proportionally reduced.

In the alternative from of FIG. 4, there is again shown at 16 the extrusion chamber in which the extruding screw 5 feeds the paste product which is discharged from the nozzle 16a. There is formed in the lateral wall of the extrusion chamber a tapped opening 44 in which is screwed the open end of a cylinder 45 which is threaded at 46. Said cylinder opens freely into the extrusion chamber and this opening is closed off by the underface 47 of a piston, the top face 48 of which forms with the cylinder end-plate 49 a chamber 50 into which a fluid under pressure such as, in particular, compressed air, is admitted through a pipe 51.

Between an annular flange 52 formed in the piston body and an annular abutment shoulder 59 formed in the internal wall of the cylinder 45 is interposed a helical spring 54 of low strength, the function of which will be explained hereinafter. Sealing of said piston can be ensured by means of at least one O-ring seal 55.

The operation of the device referred-to is as follows:

At the commencement of a cycle, the extrusion chamber and the interior of the nozzle are filled with paste product and compressed air is admitted through the pipe 51 into the chamber 50; the position of the abutment shoulder 53 and the strength of the spring are so regulated that, as a preferable arrangement, the face 47 of the piston is located flush with the lateral wall of the extrusion chamber; in this manner, the volume of this chamber remains as initially established by design.

The extrusion and feed screw being set in rotation, the paste product is brought into the extrusion chamber and drives out the product which was already present within the chamber.

In spite of the extrusion pressure, the piston remains motionless under the action of the compressed air.

The paste product contained in the extrusion chamber is discharged through the nozzle 16a, and, when a suitable length of rod has been obtained, the rotation of the feed screw is stopped, in a manner which is already known. The motion of the screw is usually stopped by means of a system of electric micro-contacts and relays, the operation of which in turn serves to actuate an electrovalve inserted in the path of the pipe 51, the effect thereby achieved being to connect the chamber 50 to the atmosphere at the moment when the feed screw is stopped.

Under the extrusion pressure and the additional pressure exerted by the spring 54, the piston lifts to a slight extent, with the result that the extrusion pressure is immediately reduced to zero; the rod of product is therefore no longer discharged from the extrusion nozzle at the very moment when the feed screw stops rotating. In the measurement of the length of extruded product which corresponds to a predetermined weight, it is thus possible to achieve a degree of precision such that, in the case of a section of product weighing two hundred and fifty grams, this exact weight can be obtained to within 0.1 gram.

It can be an advantage in certain cases to limit the displacement of the piston under the action of the extrusion pressure. Accordingly, provision can be made, for example, for a screw 56 which is passed through a tapped opening of the cylinder end-plate 49 and which serves as a stop for said piston when this latter is displaced under the extrusion pressure.

We claim:

1. Apparatus for the extrusion of paste products, said apparatus comprising:
   a casing having an extrusion chamber therein;
   a hopper mounted on said casing and adapted for holding the product to be extruded, said hopper having an elongated feed opening in the bottom thereof communicating with said extrusion chamber;
   a rotatable extrusion screw mounted in said extrusion chamber and extending across said feed opening;
   an extrusion nozzle mounted on said casing for receiving material from said screw;
   a feed drum rotatably mounted in the bottom portion of said hopper substantially adjacent said feed opening, said feed drum being rotatable about an axis substantially transverse to the screw axis, a plurality of circumferentially spaced vanes mounted on said drum and extending away therefrom through said feed opening into said extrusion chamber, said vanes substantially extending across the width of said feed opening and said extrusion chamber, said vanes each being of one-piece construction and having a substantially straight outer edge arranged to extend substantially diametrically across said extrusion chamber, said outer edge having an arcuate recess therein between the ends thereof for receiving a portion of the base of said extrusion screw;
   each of said vanes having a portion adapted to cooperate with and contact the flank of the thread of said screw whereby said feed drum is rotated in response to rotation of said screw.

2. Apparatus according to claim 1, wherein said casing has a plurality of extrusion chambers therein, and an extrusion screw mounted in each extrusion chamber;
   said hopper having a single feed opening communicating with all of said extrusion chambers, said feed drum having vanes which are common to and adapted to cooperate with all of said screws.

3. Apparatus according to claim 1, wherein the flank of said extrusion screw has a pitch which varies from one end of the screw to the other.

4. Apparatus according to claim 1, including orifice control means for selectively varying the size of the extrusion opening, said orifice control means comprising cylinder means mounted on said extrusion nozzle and lever means operatively connected to said cylinder means for angularly moving same, said cylinder means having a flattened wall portion which is located in the plane of a wall portion of the nozzle opening when said cylinder means is in one position, angular displacement of said lever means causing corresponding angular movement of said cylinder means whereby said cylinder means projects to a partial extent into the interior of the nozzle opening, the size of the opening decreasing progressively as the angular displacement of the lever means increases relative to said one position.

5. Apparatus for the extrusion of paste products, said apparatus comprising:
   a casing having an extrusion chamber therein and an extrusion nozzle at one end of said extrusion chamber;
   a hopper mounted on said casing and adapted for holding the product to be extruded, said hopper having an elongated feed opening in the bottom thereof communicating with said extrusion chamber;
   a rotatable extrusion screw mounted in said extrusion chamber and extending across said feed opening;
   a feed drum rotatably mounted in the bottom portion of said hopper substantially adjacent said feed opening, said feed drum being rotatable about an axis substantially transverse to the screw axis, a plurality of circumferentially spaced vanes mounted on said drum and extending away therefrom through said feed opening into said extrusion chamber;
   the thread of said screw terminating at a point spaced from said nozzle so that there is provided a zone in said chamber between said nozzle and said screw, said zone being in communication with said extrusion nozzle so that the pressure on the material in said zone responds to the pressure on the material going through said extrusion nozzle; and
   pressure relieving means communicating with said zone, said pressure relieving means including means for maintaining a constant volume in said zone when said screw is rotating and means for increasing the volume of said zone when rotation of said extrusion screw is stopped.

6. Apparatus according to claim 5, in which said pressure relieving means comprises a cylinder mounted on said casing and having an opening communicating with said extrusion chamber at a position therein between said nozzle and the discharge end of said screw, a piston mounted within said cylinder and having an inner end thereof with a configuration substantially conforming to the inner wall of said chamber, a shoulder on said cylinder against which said piston can be abutted for limiting the travel of said piston toward said chamber, said inner end of said piston being flush with the inner wall of said chamber when said piston is in contact with said shoulder; means for continuously biasing said piston in a direction away from said chamber and said shoulder, and piston control means for urging said piston against said shoulder when said screw is rotating and for releasing said piston from said annular shoulder when said extrusion screw is stopped.

7. Apparatus according to claim 6, wherein said piston control means includes means for applying a pressurized fluid on said piston for urging said piston against said shoulder, and means for relieving the fluid pressure on said piston when the extrusion screw is stopped, whereby said piston is moved outwardly from said extrusion chamber allowing the pressure in said chamber to be released.

8. Apparatus for the extrusion of paste products, said apparatus comprising:
   a tubular casing;
   a hopper mounted on said casing and adapted for holding the product to be extruded, said hopper having an elongated feed opening in the bottom thereof communicating with said casing;
   a rotatable extrusion screw mounted in said casing and extending across said feed opening;
   separate tubular members closely axially slidably disposed within said casing and defining an extrusion chamber, an extrusion nozzle and a compression chamber interposed betwen said extrusion chamber and said nozzle, said tubular members including an end tubular member which extends beyond the end of said tubular casing; and
   pressure applying means connected to said end tubular member outside of said tubular casing for exerting a clamping pressure which is exerted in a direction parallel to the axis of said screw.

9. Apparatus according to claim 8, wherein said pressure applying means includes a lever member pivotally connected at one end thereof to said casing, and linkage means pivotally connected to the other end of said lever member, said lever member coacting with said extrusion nozzle intermediate its length, movement of said lever causing application of pressure to said nozzle so as to maintain said separate tubular members defining said nozzle and said chambers in proper assembled relationship.

10. Extrusion apparatus, comprising:
    a casing having an extrusion chamber therein and an extrusion nozzle at one end of said extrusion chamber;
    an extrusion screw rotatable in said chamber for extruding material through said nozzle, the thread of said screw terminating at a point spaced from said nozzle so that there is provided a zone in said chamber between said nozzle and said screw, said zone being in free communication with the extrusion nozzle so that the pressure on the material in said zone responds directly to the pressure on the material flowing through said extrusion nozzle;
    a pressure relief device communicating with said zone, said pressure relief device including means for maintaining a constant volume in said zone when said screw is rotating and means for increasing the volume of said zone when rotation ow said extrusion screw is stopped.

11. Extrusion apparatus according to claim 10, in which said pressure relief device comprises a cylinder provided in the casing and having an open inner end communicating with said zone, a piston slideably mounted in said cylinder, a shoulder on said cylinder against which said piston can be abutted for limiting the travel of said piston toward said zone, means for continuously urging said piston in a direction away from said chamber and said shoulder and piston control means for moving said piston against said shoulder when said screw is rotating and for releasing said piston when said extrusion screw is stopped to permit said piston to be moved away from said shoulder by said urging means.

References Cited

UNITED STATES PATENTS

| | | | |
|---|---|---|---|
| Re. 23,839 | 6/1954 | Magerkurth et al. | 18—12 |
| 1,164,276 | 12/1915 | Fogarth | 18—12 |
| 1,546,155 | 7/1925 | Wadsworth | 18—12 X |
| 2,047,395 | 7/1936 | Stilkens | 18—12 |
| 2,519,014 | 8/1950 | Bankey. | |
| 2,567,704 | 9/1951 | Grimes | 18—12 |
| 2,694,256 | 11/1956 | Coon et al. | 18—12 X |
| 3,070,836 | 1/1963 | De Haven et al. | 18—12 X |
| 3,122,789 | 3/1964 | Coffee. | |
| 3,134,832 | 5/1964 | Smith | 18—14 X |
| 3,160,915 | 12/1964 | Wallace | 18—12 |
| 3,178,770 | 4/1965 | Willis | 18—12 |

FOREIGN PATENTS

| | | |
|---|---|---|
| 513,692 | 9/1952 | Belgium. |
| 637,089 | 5/1952 | Great Britain. |

WILLIAM J. STEPHENSON, *Primary Examiner.*